United States Patent [19]

Brolin et al.

[11] 4,056,690

[45] Nov. 1, 1977

[54] AUTOMATIC NUMBER IDENTIFICATION IN SUBSCRIBER LOOP CARRIER SYSTEMS

[75] Inventors: Stephen Joseph Brolin, Livingston; Samuel Colodner, Succasunna, both of N.J.

[73] Assignee: Bell Telephone Laboratories, Incorporated, Murray Hill, N.J.

[21] Appl. No.: 732,343

[22] Filed: Oct. 14, 1976

[51] Int. Cl.[2] .......................................... H04M 15/36
[52] U.S. Cl. ................................. 179/17 A; 179/2.5 R
[58] Field of Search ............. 179/2.5 R, 2.5 A, 2.5 B, 179/8.5, 15 BY, 17 A, 17 E, 18 FH

[56] References Cited

U.S. PATENT DOCUMENTS

| 3,673,330 | 6/1972 | Suntop et al. | 179/2.5 R |
| 3,676,602 | 7/1972 | Goetchius et al. | 179/17 A |
| 3,688,050 | 8/1972 | Goetchius et al. | 179/17 A |

Primary Examiner—Kathleen H. Claffy
Assistant Examiner—Gerald L. Brigance
Attorney, Agent, or Firm—Robert O. Nimtz

[57] ABSTRACT

A subscriber loop carrier system using digital transmission techniques is disclosed in which remote subscriber loops include two-party lines equipped for automatic number identification. The calling party going off-hook causes an automatic number identification (ANI) test request to be sent to the subscriber location. The ANI response signal is then encoded and transmitted to the central station to indicate which party is initiating the call. The same test for automatic number identification is repeated for any substantial discontinuity in the central office loop current to obtain an updating of the automatic number identification information. Encoded pulse signals are used for both the ANI test request and the ANI response signal.

10 Claims, 4 Drawing Figures

REMOTE TERMINAL

DUAL MODE CURRENT DETECTOR

AUTOMATIC NUMBER IDENTIFICATION IN SUBSCRIBER LOOP CARRIER SYSTEMS

BACKGROUND OF THE INVENTION

1. Field of the Invention

This invention relates to subscriber loop carrier systems and, more particularly, to automatic number identification in digital subscriber loop transmission systems.

2. Description of the Prior Art

It is common practice on two party telephone loops to provide a direct current ground connection at the subset of one of the two subscribers but not at the other. When the subscriber with the ground connection goes off-hook, the ground connection can be detected at the central office (by current measurements) to insure proper billing to the calling subscriber. Detection is accomplished by monitoring the balanced longitudinal current to the subscriber subset.

In subscriber loop carrier systems where the connection between the subscriber and the central office includes carrier facilities, a direct measurement of loop current is no longer feasible. In this situation, it is necessary to encode the automatic number identification signals in such a fashion as to permit its transmission through the carrier system. The automatic number identification signal must then be detected at the central office location and repeated to the central office circuits to insure proper billing.

Since the metallic loop is not generally available on a continuous basis for ANI signals in a carrier system, another method for transmitting ANI information must be used. Moreover, changes in the calling party must be detected to bill the correct subscriber for a second call.

SUMMARY OF THE INVENTION

In accordance with the illustrative embodiment of the present invention, automatic number identification is accomplished in subscriber loop carrier systems for encoding the automatic number identification signals on the carrier and transmitting that encoded ANI signal to the central office terminal. This ANI information is derived during a short test period controlled from the central office terminal. The ANI indication can then be stored at the central office circuits to insure proper billing.

In order to assure proper billing for all calls, an automatic number identification test is initiated, not only at the beginning of each call, but also at each substantial discontinuity in the central office loop current. Such discontinuities suggest the possibility of a change in calling subscribers (e.g., central office disconnect prior to return to dial tone).

In order to insure an accurate response to each test request, each automatic number identification test is timed for a period sufficient to guarantee an accurate test response. The result of the latest ANI test is then stored at the central office location and is continually available for use by the central office billing circuits. Stored ANI information is changed only when a new ANI test indicates the change is necessary.

The ANI testing arrangements of the present invention insure the availability of an ANI signal to the central office billing circuits at all times and, moreover, insure that this information is automatically updated at any time where a new ANI test indicates that a change in subscriber has taken place, insuring proper billing. The carrier transmission system is thus used for only very brief periods of time for ANI signaling, yet a continuous indication of party identification is always available at the central office.

DETAILED DESCRIPTION

Figure 1:
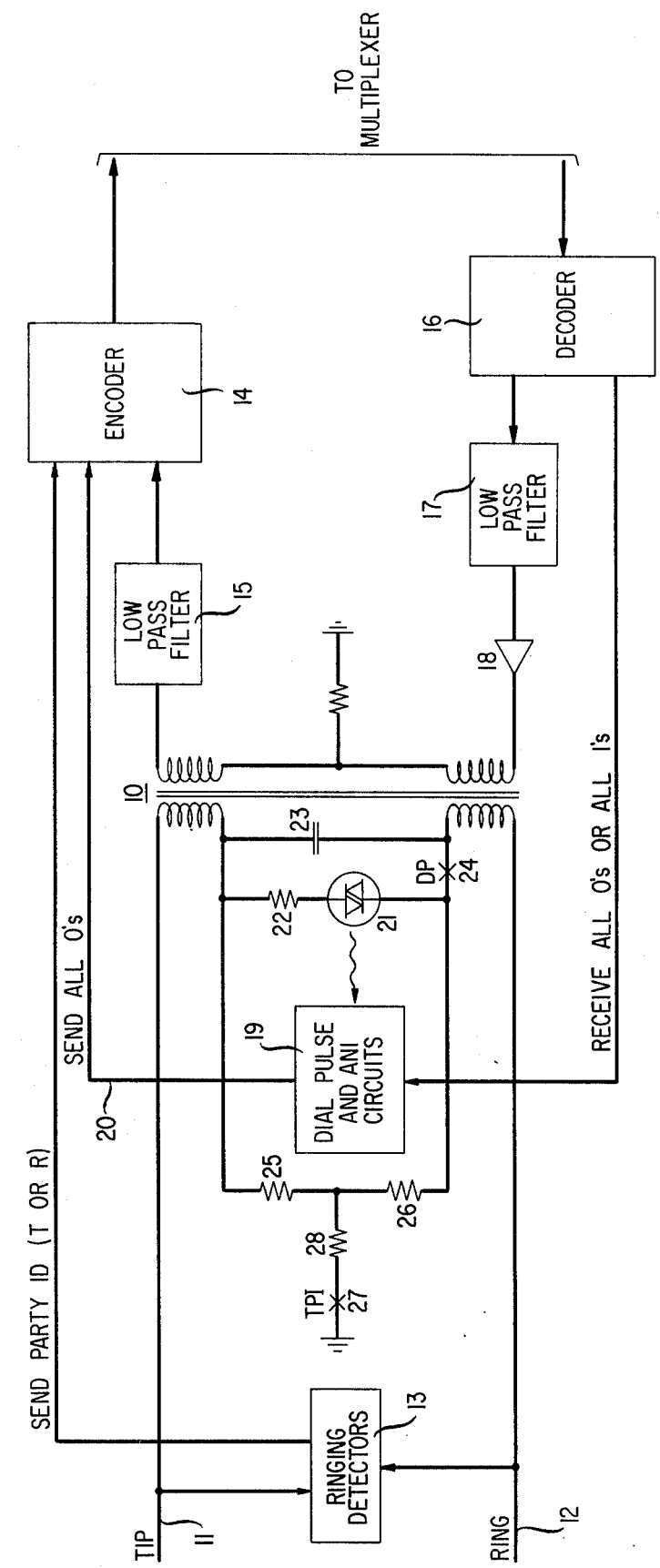
FIG. 1 is a general block diagram of a central office terminal for a digital subscriber loop carrier system and including automatic number identification circuits in accordance with the present invention.

In FIG. 1 there is shown a general block diagram of the central office terminal of a subscriber loop carrier system having automatic number identification circuits in accordance with the present invention. The central office terminal of FIG. 1 comprises a hybrid transformer 10, one side of which is connected to tip conductor 11 and ring conductor 12 from the central office circuits. A ringing signal detector 13 is connected between conductors 11 and 12 and detects ringing signals which serve ot identify the particular party of a multiparty line who is being called. As shown in detail in the copending application of R. J. Canniff and M. T. Manfred, Ser. No. 659,369, filed Feb. 19, 1976, these ringing signals can be encoded by an encoder 14 for transmission in the digital pulse stream to the remote subscriber location. One such ringing detector is shown in the copending application of S. J. Brolin, Ser. No. 724,381, filed Sept. 17, 1976.

Voice signals appearing on tip conductor 11 and ring conductor 12 are transmitted through hybrid 10 to low-pass filter 15 and thence to encoder 14. Encoder 14 encodes the analog voice signals into a digital format suitable for multiplexing and transmission on a digital transmission facility. One such encoder is shown in S. J. Brolin U.S. Pat. No. 3,899,754, granted Aug. 12, 1975.

Digital signals received from the remote carrier terminal are decoded in decoder 16 which may also take the form of the decoders shown in the above named Brolin U.S. Pat. No. 3,899,754. Analog signals from decoder 16 are applied to low-pass filter 17 and then to voice frequency amplifier 18. The output of amplifier 18 is applied to hybrid transformer 10 and appears between tip conductor 11 and ring conductor 12. These voice signals can then be transmitted to other subscribers of the telephone system.

As shown in the aforementioned application of Canniff and Manfred, the supervisory conditions at the remote subscriber location can also be encoded on the digital pulse stream in the same fashion as ringing signals at the central office terminal. In particular, a continuous succession of "all 1s" in the digital pulse stream from the subscriber location indicates an on-hook or dial pulse break at the subscriber location. If the loop current at the subscriber location indicates the presence of a ground at the subscriber subset (an automatic number identification condition), an "all 0s" signal can be transmitted on the digital pulse stream. The "all 1s" and "all 0s" conditions are detected by decoder 16 and are forwarded to a dial pulse and automatic number identification circuit 19 shown in FIG. 1. Circuits 19 perform the function of initiating an automatic number identification test by sending an "all 0s" signal from the central office location to the remote location. This is done by a signal on lead 20 when a loop closure is first detected by decoder 16. An automatic number identification test is also initiated for each discontinuity of sufficient duration in the central office loop current. This loop current is detected by light-emitting diodes 21 connected between the primary windings of hybrid transformer 10 and in series with a current limiting resistor 22. Capacitor 23 completes the low impedance path for voice frequency signals. Detection circuits 19 respond to a discontinuity in the light emitted by diodes 21 to initiate a new automatic number identification test for each discontinuity in the central office loop current.

Dial pulse and ANI circuits 19 include two relay control circuits. Loop closures, detected at the subscriber location and indicated by removal of the "all 1s" signal received by decoder 16, operate DP contacts 24 to provide a direct current path between tip conductor 11 and ring conductor 12 through resistors 25 and 26 in parallel with resistor 22 and diode 21. An automatic number identification test at the remote subscriber terminal which detects a subscriber with a grounded subset causes an "all 0s" code to be transmitted and detected by detector 16. This "all 0s" code operates a relay in circuits 19 to close TPI contacts 27 and thus permits a longitudinally balanced direct current to flow in conductors 11 and 12 and through resistor 28. This longitudinally balanced current is interpreted in the central office as an automatic number identification signal and can be used for billing purposes. The TPI relay is operated from a digital memory in circuits 19 and its state is not changed during the call unless a new ANI test indicates a change in party.

Figure 2:
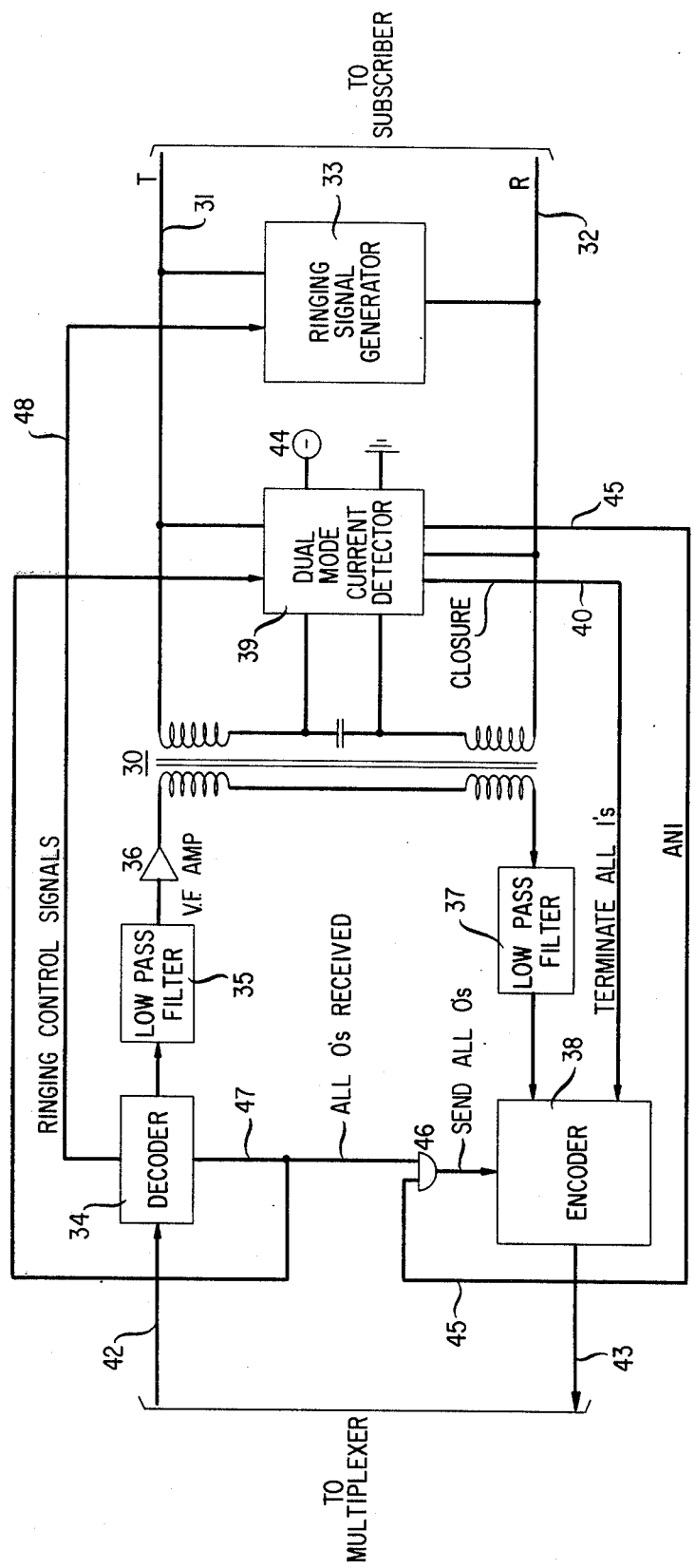
FIG. 2 is a general block diagram of the remote terminal for a digital subscriber loop carrier system equipped for automatic number identification.

At the remote terminal, shown in FIG. 2, a digital pulse stream is delivered on line 42 to decoder 34. Decoder 34 may be identical to decoder 16 in FIG. 1 and functions to translate the digital pulse stream on line 42 to an analog voice signal which can be delivered to low-pass filter 35 and voice frequency amplifier 36. This analog voice signal is then applied to hybrid 30 to deliver the analog voice signal to the subscribers on tip and ring conductors 31 and 32, respectively.

Analog voice signals from the subscriber are delivered by way of conductors 31 and 32 to hybrid 30 and thence to low-pass filter 37. The filtered voice signals are applied to encoder 38, which may be identical to encoder 14 in FIG. 1. Encoder 38 translates the analog voice signals into a digital pulse stream which is delivered on line 43 to the digital carrier system.

Decoder 34 recognizes the ringing signals encoded on the digital pulse stream and applies, on lead 48, the decoded control signals to a ringing signal generator 33. Generator 33 regenerates the multiparty superimposed ringing signals as dictated by the control signals and applies these ringing signals to conductors 31 and 32. The proper subscriber telephone set is thereby rung.

A dual mode current detector 39 is connected between the midpoints of the subscriber windings of hybrid 30 and supplies talking battery from source 44 to the subscriber telephone sets. Detector 49 includes circuit means for detecting both the metallic and longitudinal current levels in the subscriber loop and will be described in detail in connection with FIG. 4.

When both subscribers are on-hook, the subscriber loop is open and no current flows. One subscriber closes the loop by removing his handset from its cradle, thereby permitting a loop current to flow. This loop current is detected by detector 39 and an output signal is applied to conductor 40. The signal on lead conductor 40 is applied to encoder 38 to cause encoder 38 to terminate the on-hook sequence of "all 1s" transmitted on conductor 43. Instead, digitally encoded speech is transmitted. As noted in connection with FIG. 1, this loss of "all 1s" signal is utilized at the central office terminal to indicate off-hook and dial pulsing (loop break) conditions.

In accordance with standard telephone design, one party of a two party ANI subscriber loop includes a ground connection at the subscriber set. This ground connection causes a dc longitudinal current to flow to ground in addition to the normal dc metallic loop flow through a set without the ground connection.

The presence of this dc longitudinal current is detected in detector 39, and distinguished from normal cable leakages and longitudinal power line interferences. Detector 39 then outputs a logic signal on lead 45 which indicates whether the filtered dc longitudinal current component is above or below a predetermined threshold. The presence of a current above the threshold indicates tip party off-hook, while current between zero and the threshold indicates ring party off-hook. Since the ANI test is brief, and does not interfere with dial pulsing, detector 39 can be reconfigured for the different current detection modes to maximize reliability of the ANI test. This will be described in more detail in connection with FIG. 4.

The automatic number identification signal on lead 45 is combined in AND gate 46 with a signal on lead 47, indicating that all "all 0s" signal has been received by decorder 34. As described in connection with FIG. 1, the "all 0s" signal is a request for an ANI test and thus AND gate 46 is enabled only during the period for which an AND test request is made.

The output of AND gate 46 is applied to encoder 38 and causes encoder 38 to transmit a stream of "all 0s." As discussed in connection with FIG. 1, this "all 0s" signal is utilized to determine the party identification at the central office terminal. An "all 0s" signal is transmitted if the tip party is off-hook but is not transmitted if the ring party if off-hook.

In operation, an automatic number identification sequence is initiated in accordance with the illustrative embodiment of the present invention by either one of the subscribers going off-hook, indicated by interruption of the "all 1s" signal transmitted from the remote terminal to the central office terminal, or by a discontinuity in the central office current, as indicated by light-emitting diodes 21. In response to either of these signals, an ANI test sequence takes place in which an "all 0s" signal is transmitted from the central office to the remote terminal for a timed interval. During this interval a party identification signal is transmitted from the remote terminal to the central office terminal in the form of an "all 0s" signal or absence thereof. The presence of the "all 0s" signal identifies the active subscriber as the tip subscriber. The absence of an "all 0s" signal during this test interval identifies the ring subscriber as the active subscriber. Thus, at the end of the timed interval, the central office terminal has an indication of which party on the two-party line is active. The details of the various detection circuits will be taken up in detail in FIG. 3.

Figure 3:
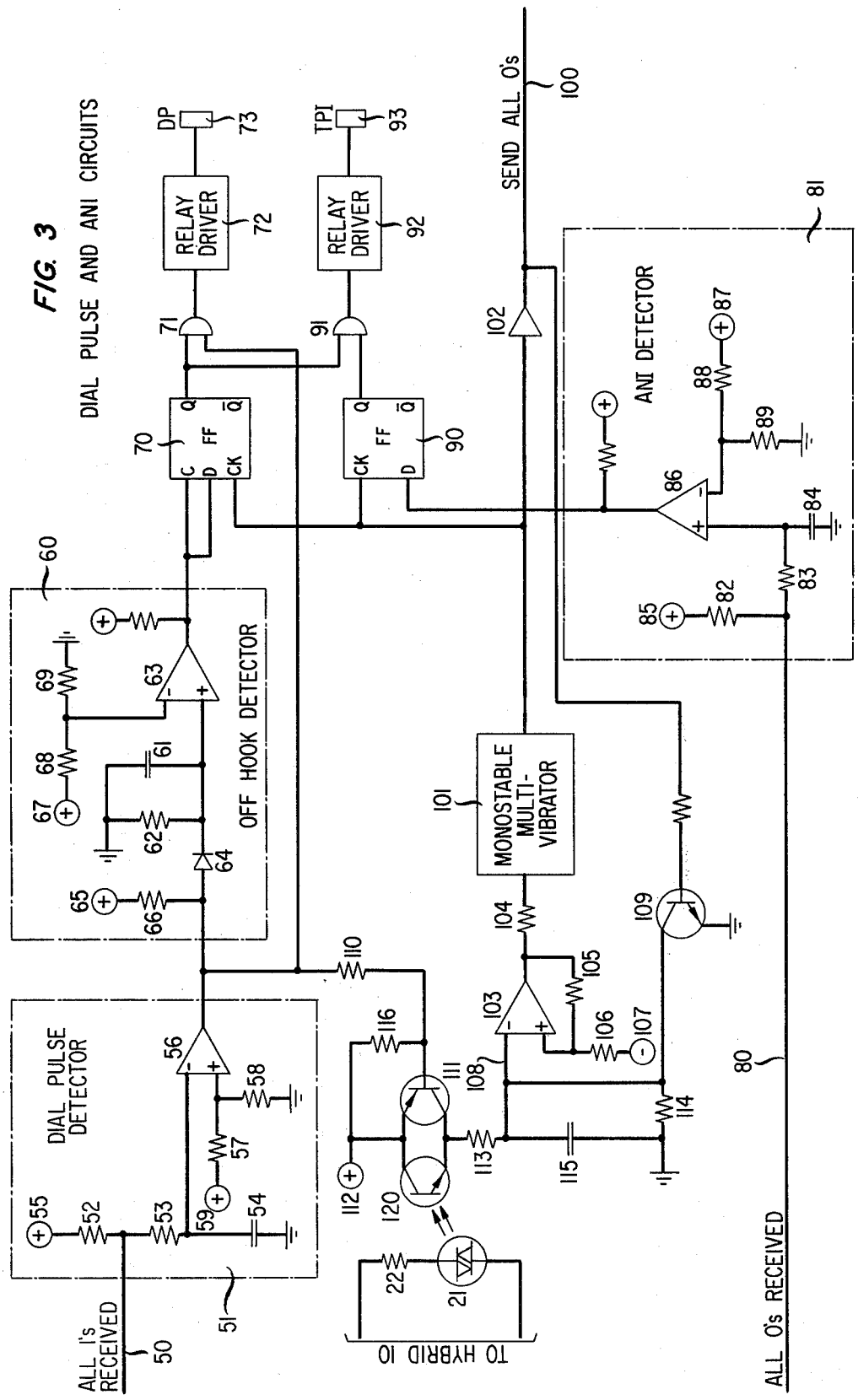
FIG. 3 is a detailed circuit diagram of the dial pulse and automatic number identification circuits useful in the central office terminal of FIG. 1.

In FIG. 3 there is shown a detailed circuit diagram of the dial pulse and automatic number identification circuits shown in block form in FIG. 1. An "all 1s" signal, appearing on lead 50 when the subscriber is on-hook, is applied to a dial pulse detector 51 including resistors 52 and 53 and capacitor 54 connected between positive voltage source 55 and ground potential. A high signal on lead 50, applied to the midpoint of resistors 52 and 53, permits the voltage on capacitor 54 to rise to a level sufficient to trigger comparator circuit 56. A low on lead 50 during the "off-hook" condition will cause the voltage on capacitor 54 to fall well below this threshold. The other input to a comparator circuit 56 is a constant voltage derived from a voltage divider including resistors 57 and 58 connected between voltage supply 59 and ground potential. A high output from detector 51 indicates off-hook (absence of "all 1s"); a low output from detector 51 indicates on-hook.

The output of dial pulse detector 51 is supplied to off-hook detector 60 which includes a capacitor 61, shunted by a discharging resistor 62, and connected between one input of comparator 63 and ground potential. A diode 64 is connected in the charging path for capacitor 61 and is forward-biased only when the output of detector 51 is high. A high output from comparator 56 in dial pulse detector 51 thus forward-biases diode 64 and permits capacitor 61 to charge to a sufficient level to trigger comparator 63. The other input to comparator 63 is connected to a constant voltage supply derived from positive voltage source 67 across a voltage divider including resistors 68 and 69. If comparator 56 remains high for a sufficient length of time, capacitor 61 will charge to a level where comparator 63 is triggered. This output from comparator 63 is applied to the D and Clear inputs of flip-flop 70.

It can be seen that dial pulse detector 51 responds quickly to loop breaks (pulses) at the subscriber location and thus is able to track dial pulses emitted at the subscriber location. Off-hook detector 60, on the other hand, has a slower response time to breaks (due to capacitor 61) and, once triggered, maintains its output through the break intervals of dial pulses, due to the slow discharge rate afforded by resistor 62.

The output of flip-flop 70 is supplied through AND gate 71 to a relay driver circuit 72 which, in turn, operates DP relay 73. Relay 73 operates DP contacts 24 in FIG. 1 to indicate a loop closure to the central office.

An "all 0s" signal on lead 80 from decoder 16 in FIG. 1 is applied to an ANI detector 81 which is similar to the dial pulse detector 51. Lead 80 is connected to the midpoint of resistors 82 and 83 which are connected in series with capacitor 84 between positive voltage source 85 and ground potential. The midpoint between resistor 83 and capacitor 84 is connected to one input of comparator circuit 86. The other input to comparator circuit 86 is a constant voltage supplied from positive voltage source 87 across a voltage divider including resistors 88 and 89.

The output of comparator 86 is applied to the D input of the flip-flop 90. The output of flip-flop 90 is supplied through AND gate 91 to a relay driver circuit 92 which, in turn, operates TPI relay 93. Relay 93 operates TPI contacts 27 in FIG. 1 to supply a balanced direct current ground path to the central office which is interpreted as a tip party identification signal by the central office billing circuits.

In order to assure accurate automatic number identification, the circuits of FIG. 3 request an automatic number identification test by a signal on lead 100. The signal on lead 100 is supplied to encoder 14 in FIG. 1 and directs encoder 14 to send an "all 0s" ANI test signal to the remote terminal. Conductor 100 is connected to monostable multivibrator circuit 101 through inverter circuit 102. Monostable multivibrator 101 is used as a timing circuit to time the duration of the automatic number identification test and thus insure that an adequate time has elapsed to permit a proper automatic number identification response. Monostable multivibrator 101 is responsive to the output of a trigger circuit including operational amplifier 103, the output of which is connected to multivibrator 101 through resistor 104. A feedback resistor 105 is connected from the output of amplifier 103 to its other input which is also connected through resistor 106 to positive voltage source 107. Once triggered by the input signal on lead 108 going low, circuit 103 rapidly changes its output state to trigger monostable multivibrator 101. The output of multivibrator 101 is used to turn transistor 109 ON and thus lock input lead 108 to ground potential. This prevents monostable multivibrator 101 from being triggered OFF once it has been triggered ON by an appropriate signal on lead 108. Rearming of monostable multivibrator 101 will occur after the timing pulse, when transistor 109 is turned off, if the voltage on lead 108 then rises. The hysteresis around amplifier 103 guarantees a minimum rearm time for multivibrator 101 if rearming does occur. This rearm time further ensures only a full length test pulse will be generated.

If no loop current flows (e.g., if the central office connection is cut) then no rearm takes place and no repetitive tests will occur.

A triggering signal appears on lead 108 only if both of two conditions are present, namely, off-hook, indicated by detector 51, and absence of loop current through the central office interface, indicated by diodes 21.

A high output from dial pulse detector 51, applied through resistor 110 to the base of transistor 111, will turn transistor 111 OFF. Lack of current from the central office will turn transistor 120 OFF. The loss of voltage from transistor 111 and from transistor 120 to resistors 113 and 114 permits capacitor 115 to discharge, causing the voltage at lead 108 to go below the triggering level of amplifier 103. The output of amplifier 103 then goes high and triggers multivibrator 101.

It can thus be seen that, at initial loop closure at the remote subscriber location, the removal of the "all 1s" signal from the subscriber location triggers dial pulse detector 51 and, by way of transistor 111 and amplifier 103, initiates an automatic number identification test by monostable multivibrator 101 on lead 100. Both relays 73 and 93 are unoperated at this time since flip-flop 70 is not set, and no loop current flows. The output of monostable multivibrator 101 is supplied as an arming signal to the edge-triggered clock inputs of flip-flop 70 and 90. These flip-flops will not change state during the automatic number identification test, but will read in information on their "D" inputs on the terminating edge of the ANI test pulse.

AND gate 71 permits relay 73 to respond to both flip-flop 70 and to detector 51 which must indicate an off-hook condition to operate relay 73. Thus the operation of relay 73 is inhibited during the initial loop closure preceding dialing (by flip-flop 70) to enable the automatic number identification test to take place prior to alerting the central office. After operation of flip-flop 70, AND gate 71 permits detector 51 to control the repetition of dial pulses via DP relay 73 and contacts 24 in FIG. 1. AND gate 91 is used to inhibit the operation of TPI relay 93 in the absence of an off-hook condition and during ANI testing following initial loop closure.

At the terminating edge of the ANI test pulse applied to the clock input of flip-flops 70 and 90, a "1" will be read into flip-flop 70 since the subscriber is necessarily off-hook during the initial ANI test. In addition, a "1" will be read into flip-flop 90 for the tip party or a "0" for ring party. Relay 73 is then operated by flip-flop 70, and relay 93 is operated by flip-flop 90 if the tip party is off-hook. Flip-flop 70 is maintained set during the entire call, including dial-pulsing, by the delay characteristic of detector 60.

If the central office generates an interruption in the central office loop current while a subscriber is off-hook, this will be detected by diodes 21 and transistor 120 with transistor 111 held nonconducting by the output of detector 51. A new ANI test will be initiated by amplifier 103 and multivibrator 101. This time, however, relay 73 will be held operated during the test. The state of relay 93 will also be held during the test, by flip-flop 90, and will only be changed on the trailing edge of the test pulse if a different test result is obtained. Such an interruption in loop current will occur just before a "return-to-dial-tone" on a call where only one end hangs up. A new ANI test at this point is highly desirable.

During dial pulsing, transistor 111 conducts and overrides transistor 120 so that dial pulses are not misinterpreted as false central office loop current interruptions.

When the subscriber hangs up (an interval substantially longer than a dial pulse), detector 60 eventually goes low and clears flip-flop 70, forcing both relays to release. A new off-hook condition would then be regarded as the start of another call, with events proceeding as previously discussed.

Figure 4:
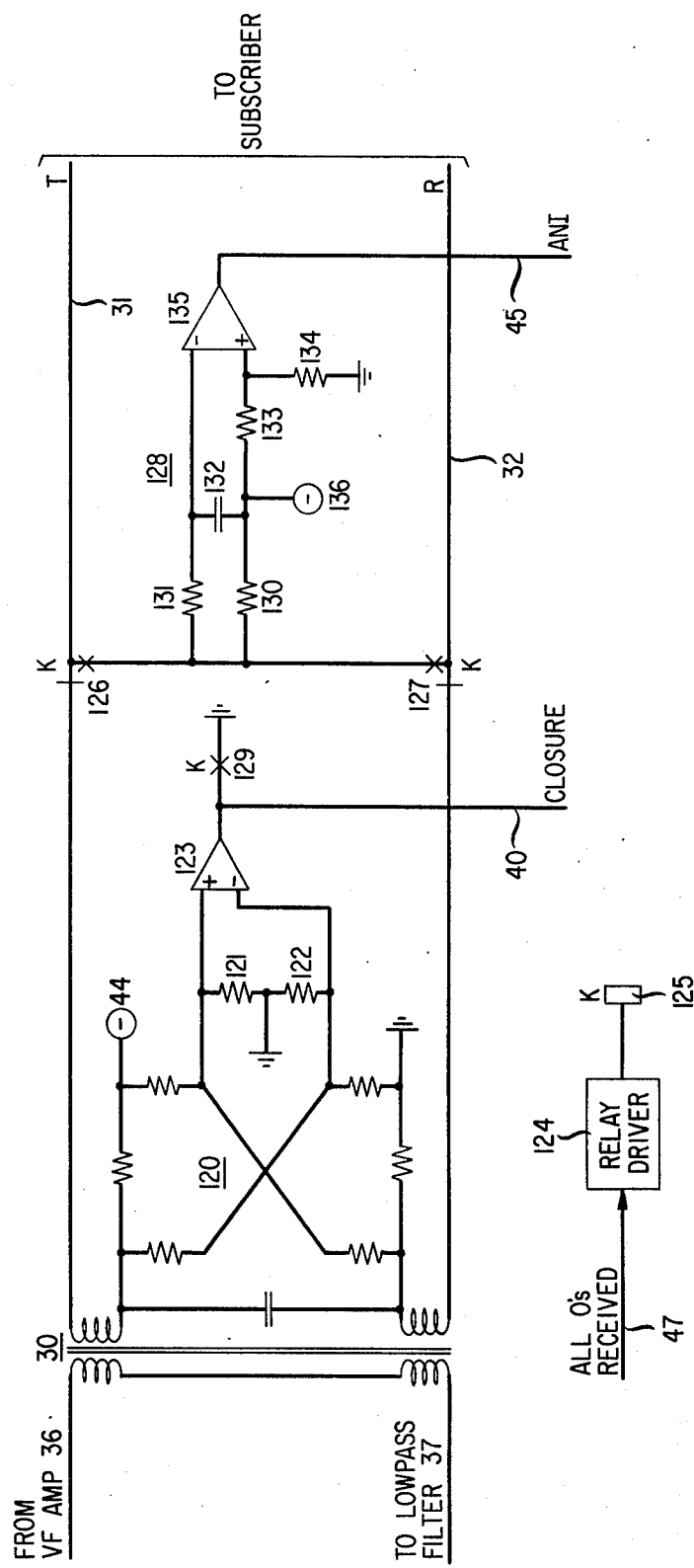
FIG. 4 is a detailed circuit diagram of the dual mode current detector shown in the remote terminal of FIG. 2.

Referring more particularly to FIG. 4, there is shown a detailed circuit diagram of a dual mode current detector which can be used as detector 39 in FIG. 2. The detector in FIG. 4 comprises a resistive bridge 120 connected in series with the normal loop talking battery supply 44 to detect metallic current flowing around the local loop from talking battery 44. The output of the bridge is supplied across resistors 121 and 122, the common midpoint of which is connected to ground potential. This voltage is supplied to the inputs of open collector threshold circuit 123, which provides a binary output on lead 40 when the input voltage exceeds a preselected threshold. In the embodiment of FIG. 4, the output is low if the input current is greater than the threshold and is high at all other times.

The signal on lead 40 corresponds to that shown on closure lead 40 in FIG. 2 and indicates the presence of local loop current. As discussed in connection with FIG. 2, the signal on lead 40 is used to control the transmission of the "all 1s" signal to the central office terminal.

During an ANI test, an "all 0s" signal is received on lead 47, as discussed in connection with FIG. 2. This signal is used by way of relay driver 124 to operate K relay 125. The operation of K relay 125 switches the mode of the detector of FIG. 4 from detecting loop metallic currents to the detection of longitudinal currents to ground. Thus, K contacts 126 and 127 disconnect the local loop from the balance of the terminal and connect the loop to longitudinal current detector 128. At the same time, K contact 129 operates to hold the output of threshold detector 123 in the low state (indicating closure).

Longitudinal current detector 128 comprises resistor 130 through which the longitudinal current flows from source 136 to develop a voltage drop across capacitor 132. Capacitor 132 filters out any 60 Hz components in the longitudinal current and supplies a voltage to one input of comparator 135. The dc voltage across resistor 132 is a direct measure of the dc longitudinal current to ground. The other input to comparator 135 is the midpoint of a voltage divider consisting of resistors 133 and 134 and source 136. The voltage across capacitor 132 is compared with the voltage across resistor 133 to produce a binary output from comparator 135.

Comparator 135 is a binary device which forces a low output condition on lead 45 if the longitudinal current in the loop exceeds a preselected threshold. Under all other conditions the output of comparator 135 is high.

The output signal on lead 45, as discussed in connection with FIG. 2, enables the transmission of an "all 0s" signal from the remote terminal to the central office terminal to identify an off-hook tip party on a two-party line. As also discussed in connection with FIG. 2, this signal persists only so long as the "all 0s" signal is received at the remote terminal and K relay 125 remains operated.

It will be noted that those elements of FIG. 4 corresponding to elements of FIG. 2 have been identified with like reference numerals, thus simplifying the correspondence between these two figures.

It can be seen that the circuits of FIG. 3 and 4 permit automatic number identification over digital subscriber carrier systems and, moreover, permit repeated tests for automatic number identification during call processing. The results of the latest ANI test are stored by the condition of flip-flop 90 and displayed to the central office by TPI relay 93, and thus are continually available to the central office for billing purposes.

What is claimed is:

1. An automatic number identification circuit for subscriber loop carrier systems comprising
    means at a central office location for initiating a timed automatic number identification test signal;
    means for transmitting said test signal on said carrier system;
    means responsive to said test signal at said subscriber location for generating an automatic number identification response signal;
    means for transmitting said response signal on said carrier system; and
    means at said central office location for storing said response signal.

2. The automatic number identification circuit according to claim 1 wherein said means for initiating a test signal includes
    means responsive to initial loop closure at said subscriber location; and
    means responsive to discontinuities in central office current at said central office location.

3. The automatic number identification circuit according to claim 1 wherein said carrier system is digital and said test and response signals comprise a continuous string of like binary signals.

4. The automatic number identification circuit according to claim 2 wherein said carrier system is digital and said means responsive to loop closure includes means for generating a continuous string of like binary signals.

5. The automatic number indentification circuit according to claim 2 wherein said means responsive to discontinuities comprises
- a light emitting diode; and
- a light detecting device.

6. An automatic number identification circuit comprising
- a timing circuit at a central office location with a timed output for enabling an automatic number identification test signal generation; and
- a storage circuit at said central office location for storing an automatic number identification response signal between successive generations of said test signal.

7. The automatic number identification circuit according to claim 6 wherein said timing circuit is responsive to both subscriber loop closure and to central office current discontinuities to initiate said output.

8. The automatic number identification circuit according to claim 6 further including a subscriber carrier system;
- means at said central office location for transmitting said timed automatic number identification test signal on said carrier system; and
- means at a remote end of said subscriber carrier system for transmitting said automatic number identification response signal on said carrier system.

9. The automatic number identification circuit according to claim 7 further including light-emitting current detection means and light detecting means at said central office location.

10. The automatic number identification circuit according to claim 6 wherein said timing circuit further comprises
- means rendering said timing circuit unresponsive to input signals for a preselected period following the immediately preceding input signal.

* * * * *